US005256289A

United States Patent [19]

Cope et al.

[11] Patent Number: 5,256,289
[45] Date of Patent: Oct. 26, 1993

[54] CENTRIFUGAL SEPARATOR INCORPORATING STRUCTURE TO REDUCE ABRASIVE WEAR

[75] Inventors: Dewey M. Cope, St. Louis, Mo.; Harry E. Derton, St. Clair, Ill.

[73] Assignee: Centrifugal & Mechanical Industries, Inc., St. Louis, Mo.

[21] Appl. No.: 787,814

[22] Filed: Nov. 4, 1991

[51] Int. Cl.[5] B01D 33/00; B04B 7/16

[52] U.S. Cl. 210/369; 210/377; 210/380.1; 494/36; 494/67

[58] Field of Search 210/360.1, 369, 374, 210/377, 380.1; 494/12, 34, 36, 43, 44, 45, 50-52, 60, 64, 66, 67, 85

[56] References Cited

U.S. PATENT DOCUMENTS

| | | | |
|---|---|---|---|
| 1,334,023 | 3/1920 | Elmore | 210/376 X |
| 1,342,743 | 6/1920 | Elmore | 210/376 |
| 1,664,769 | 4/1928 | Chance | 210/360.1 X |
| 1,903,795 | 4/1933 | Rigler | 210/377 X |
| 1,961,226 | 6/1934 | Keatley et al. | 210/369 |
| 2,043,662 | 6/1936 | Howe | 210/360.1 X |
| 2,370,353 | 2/1945 | Howe | 210/377 X |
| 2,727,631 | 12/1955 | Pate | 210/377 X |
| 2,752,043 | 6/1956 | Van Riel | 210/377 X |
| 3,074,842 | 1/1963 | Strong | 210/360.1 X |
| 3,289,843 | 12/1966 | Nyrop | 210/369 X |
| 3,315,810 | 4/1967 | Humphrey et al. | 210/369 |
| 3,361,264 | 1/1968 | Quetsch | 210/377 X |
| 3,411,631 | 11/1968 | Elsken et al. | 210/380.1 X |
| 3,438,501 | 4/1969 | Oyen | 210/380.1 X |
| 3,837,913 | 9/1974 | Hillebrand et al. | 210/380.1 X |
| 4,157,966 | 6/1979 | Hassall | 210/380.1 |
| 4,186,097 | 1/1980 | Dudley et al. | 210/380.1 X |
| 4,718,945 | 1/1988 | Schaper et al. | 494/36 X |
| 4,922,625 | 5/1990 | Farmer | 210/380.1 X |
| 4,961,722 | 10/1990 | Taylor et al. | 494/36 |

*Primary Examiner*—Harvey C. Hornsby
*Assistant Examiner*—Charles Cooley
*Attorney, Agent, or Firm*—Paul M. Denk

[57] ABSTRACT

An improved vertical, centrifugal separator (100) includes a drive mechanism (142) to which is connected both a flight assembly (138) and a screen assembly (166). An inlet assembly (124) is positioned above the flight and screen assemblies for material (M) to be separated to be fed into the separator. This material is captured between the flight and screen assemblies and falls downwardly therebetween as separation occurs A pocket assembly (144) integral with the screen assembly is positioned between a discharge port of the inlet assembly and the upper end of the flight assembly. The pocket assembly creates a "basket" for catching material introduced into the separator through the inlet assembly, and replaces the upper portion of the screen assembly which previously was used to catch this material. The screen assembly includes a rotor (182) having a plurality of spokes (196) defining an outlet for separated solid material. The spokes have attached wear pads (210) to protect them from impacts with the solid material thereby to prolong the useful life of the rotor. An outlet assembly (216) for the solid material is positioned beneath the rotor. The outlet assembly has a side wall (218) lined with ceramic plates (242) to resist impacts from the solid material falling into the outlet assembly.

20 Claims, 3 Drawing Sheets

CENTRIFUGAL SEPARATOR INCORPORATING STRUCTURE TO REDUCE ABRASIVE WEAR

BACKGROUND OF THE INVENTION

This invention relates to centrifugal separators and, more particularly, to improvements in vertical centrifugal separators which extend the useful life of various components within the separator, thereby reducing downtime of a separator and decreasing its maintenance.

As is well-known, centrifugal separators are widely used in a variety of processes in which material separation is required. Typically, material is fed into a top of the separator and is brought into contact with rotating elements within the separator. Solid material is retained near the center of the separator; while, free liquids are slung off, by centrifugal force, to the outside of the separator. These liquids are then directed to a drain outlet, and the solid material falls, by gravity, to the bottom of the separator from whence it is discharged and collected.

Because of the abrasive quality of the material fed into a separator, and the impact forces which are created as the material is moved through it, components within the separator are subject to reasonably rapid wear. Screens, rotors, etc., all need to be replaced with such frequency, that a separator has a substantial downtime while necessary maintenance is being performed.

The maintenance problem with centrifugal separators has long been recognized and different measures have been undertaken to address it. In U.S. Pat. No. 4,961,722, for example, a screen assembly is described having separate upper and lower portions. These portions are separate because in conventional centrifugal separators, the screen assembly projects as far upwardly within the separator housing as a flight assembly of the separator. In use, material introduced into the separator is flung against the screen. It then falls by gravity down the flight assembly which is mounted within the perforated sidewall of the screen. Because of the impact forces of the material against the screen, the upper portion of the screen rapidly becomes torn and needs frequent replacement. In this U.S. Pat. No. 4,961,722 patent, having a separable upper and lower screen portion facilitates replacement of the screen portion subjected to this greater wear, thus reducing downtime and maintenance costs since only part, not all, of the screen is replaced and this requires only a limited tear down of the inner portion of the separator.

While the above may be effective for its intended purpose, it will be appreciated that other portions of the separator are also subjected to wear and the capability of extending the useful life of these components will further reduce downtime and maintenance costs.

Other prior art United States patents showing related developments are disclosed in the patent to Chance, U.S. Pat. No. 1,664,769; the United States patent to Howe, U.S. Pat. No. 2,043,662; the United States patent to Pate, U.S. Pat. No. 2,727,631; the United States patent to Van Riel, U.S. Pat. No. 2,752,043; the United States patent to Strong, U.S. Pat. No. 3,074,842; and the prior art United States patent to Quetsch, U.S. Pat. No. 3,361,264.

SUMMARY OF THE INVENTION

Among the several objects of the present invention may be noted the provision of an improved centrifugal separator; the provision of such a separator which is a vertical centrifugal separator having an improved inlet area, an improved flight assembly, an improved screen assembly, and an improved outlet structure; the provision of such an improved separator in which the improvements provide for a longer component life, and for better operation of the separator in separating materials; the provision of such improvements to substantially reduce separator downtime; and, the provision of such improvements to reduce maintenance costs associated with keeping the separator in operation.

In accordance with the invention, generally stated, a vertical, centrifugal separator comprises a vertical drive mechanism including a drive shaft. A flight assembly is attached to the drive shaft and is rotatably driven by it. So is a screen assembly which includes a rotor that is also attached to the drive mechanism. The rotor is driven at a separate speed than the flight assembly. A perforated screen is carried by the rotor and is positioned outwardly of the flight assembly. And, an inlet assembly is positioned above these other elements where material to be separated is fed into the separator through the inlet assembly. This material is captured between the flight assembly and the screen and it is in this area that material separation occurs.

An improvement comprises a pocket assembly positioned between a discharge port of the inlet assembly and the upper end of the flight assembly. The pocket assembly extends radially outwardly beyond an upper end of the flight assembly. A lower end of the pocket assembly extends below the upper end of the flight assembly, and the upper end of the screen is integral with the lower end of the pocket assembly. The pocket assembly creates a "basket" for catching material introduced into the separator through the inlet assembly. The pocket assembly replaces the upper portion of the screen which previously was used to catch this material. Since the material now impacts against a sidewall of the pocket assembly rather than against the screen, the useful life of the screen is greatly extended. The rotor portion of the screen assembly has also been improved, as has an outlet assembly for solid material. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
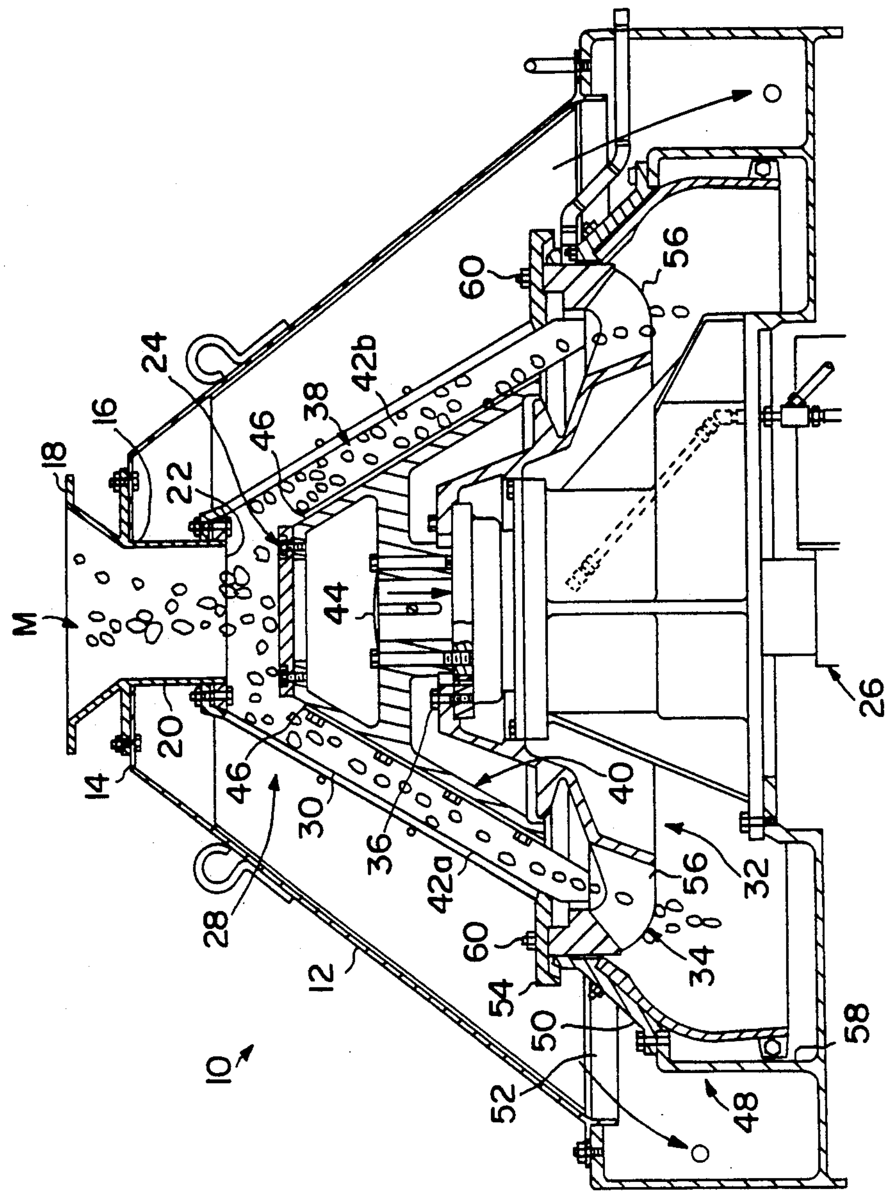
FIG. 1 PRIOR ART
FIG. 1 is a sectional view of a portion of a prior art vertical centrifugal separator.

Referring to the FIG. 1, a prior art vertical centrifugal separator is indicated at 10. The separator 10 includes a frusto-conical outer housing 12 having a top plate 14. The face plate has an opening 16 in which is fitted an inlet assembly 18 by which material M to be separated is fed into the separator. The inlet assembly is bolted to the top plate and has a vertical spout 20 extending down inside the housing. Positioned beneath an outlet 22 of the spout is a plate 24 which is rotated via a drive assembly 26. Material falling through the inlet strikes the rotating plate and is thrown off by centrifugal force. A screen assembly 28 comprises a perforated screen 30 attached to a rotor 32. (The perforations in the screen are not shown.) The screen assembly is frusto-conical in shape and the screen assembly is connected at its lower end to the rotor. The rotor is connected to the drive assembly, as indicated at 36, for the screen assembly to be rotated by the drive assembly.

A flight assembly 38 comprises a hollow frustrum of a right circular cone 40. A plurality of flights are attached to the outer surface of the cone and extend around the cone in a vertical, spiralling fashion. Two flights **42*a*, 42*b* are shown in FIG. 1. The flight assembly is mounted within housing 12, inside screen assembly 28, and it is also attached to a drive shaft 44 of drive assembly 26. The flight assembly is therefore also rotatably driven by the drive assembly, although at different speed than the screen assembly. As seen in FIG. 1, screen 30 extends upwardly above plate 24 to outlet 22 of the inlet assembly The outer tip ends 46 of flights 42*a*, 42*b* extend slightly above the height of the plate. Plate 24 is attached to the upper end of supporting cone 40. At the base of housing 10, a baffle assembly 48 includes a circumferential baffle 50 which is spaced inwardly from the side wall of the housing so a circumferential opening 52 is formed therebetween. At the base of screen assembly 28 is a horizontal, circumferential flange 54 which is secured to radially extending vanes or spokes 56 of rotor 34 by bolts 60. Because the vanes 56 are circumferentially spaced about the rotor, arcuate openings are formed therebetween. Lastly, baffle 50 has inner wall 58** which defines an outlet for the separated material.

In operation, material M, which typically consists of solid matter and free liquid falls by gravity through the inlet assembly onto plate 24. The material is flung off the plate by its centrifugal like throwing force and impacts the screen 30. Some of the material strikes the upper tip ends of the flights. In either event, the material falls between the screen and flight assemblies. As the material falls, by gravity, down the flights 42, the free liquid is slung outwardly, by impacting centrifugal or revolving force, through the openings in the screen, and strikes the inside of the housing. The liquid cascades down the housing wall and flows out through the opening O between the housing and the baffle 50. Meantime, the remaining material falls off the bottom of the flight assembly and between the vanes in the rotor assembly to the bottom of the housing A conveyor belt (not shown), or other collection mechanism, is located at the base of the housing below the separator to collect the now separated material and move it to the next station.

From the foregoing, it will be appreciated that there are many points within separator 10 at which wear, impact damage, etc. can occur so that components of the separator need to be frequently replaced. For example, the upper end of the screen is subject to a constant barrage of material which rend the screen. The upper, tip ends of the flights are also subject to constant impacts Because the screen and flight assemblies typically rotate at different speeds, the vanes 56 of the rotor continually are striking material falling off the the lower end of the flight assembly. In addition, when the vanes strike the material they knock it against wall 58. To replace these various worn and damaged separator components takes time, and the overall replacement cost for these items becomes relatively expensive.

Figure 2:
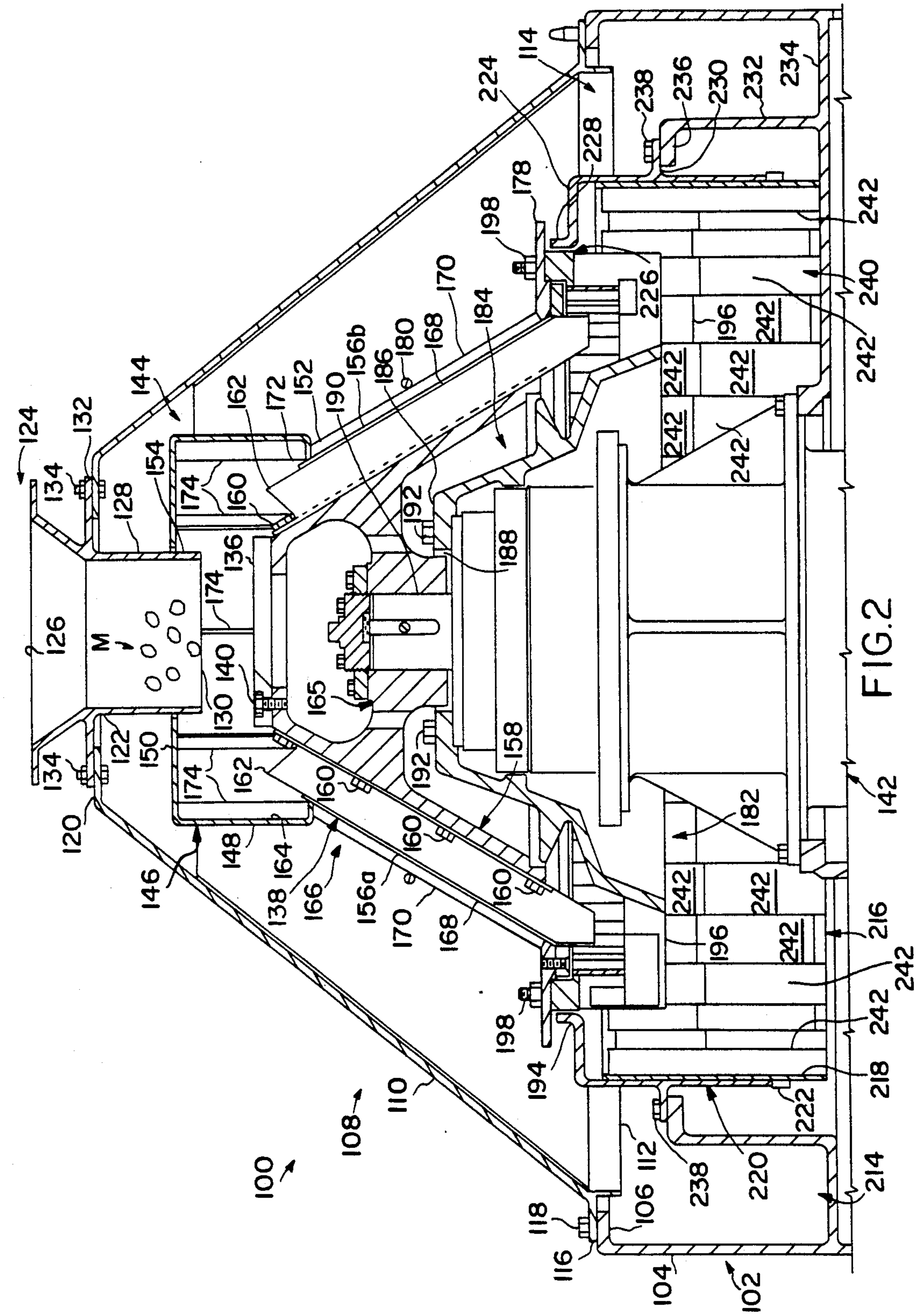
FIG. 2 is a sectional view of an improved vertical centrifugal separator of the present invention.

Referring to FIG. 2, an improved vertical, centrifugal separator 100 of the present invention is designed to obviate many of the above listed repair problems; either wholly, so that the problem is substantially eliminated, or by inclusion of components having substantially longer useful lives than prior art components. Thus, the timing and extent of replacement is greatly reduced.

As shown in FIG. 2, separator 100 first comprises a cylindrical base section 102 having a circular outer side wall 104. Wall 104 is inwardly curved or bent at its upper end to form a circumferential mounting flange 106. A hollow, frusto-conical housing section 108 has a sloping side wall 110. At the lower, greater diameter end of the housing section is formed a cylindrical wall 112 the outer diameter of which is such that the wall fits within an opening 114 formed by flange 106. At the lower, outer end of the housing, a circumferential, horizontally extending mating flange 116 is formed. When housing 108 is set in place over base 102, flange 116 is attached to flange 106, by bolts 118, to hold the housing stably in place.

The upper end of housing 108 is also inwardly turned to form a circumferential flange 120 which defines a top surface of the housing. A central, circular opening 122 is defined by the inner margin of flange 120, and an inlet assembly 124 fits conveniently into this opening. Material M to be separated is introduced into the separator via assembly 124. The inlet assembly has an upper funnel shaped open inlet end 126, and a lower hollow, cylindrical section 128. The lower end of the section 128 defines the outlet 130 of the inlet assembly, and the outer diameter of section 128 is such that it snugly fits in opening 122. A circumferential, horizontally extending flange 132 is formed on the outside of the inlet assembly at the transition between the funnel and cylindrically shaped sections of the inlet. Flange 132 is attached to the upper face of the housing by the shown bolts 134.

Positioned beneath outlet 130 is a plate 136. Plate 136 is attached to the upper end of a flight assembly 138 by bolts 140. The flight assembly, in turn, is connected to a vertical drive mechanism 142 and is turned by the drive assembly. Plate 136 rotates with the flight assembly so material falling through the inlet assembly strikes the plate and is thrown off by centrifugal force, as explained.

A pocket assembly 144 is mounted within the housing between the inlet assembly and the upper end of the flight assembly. The pocket assembly comprises a circular housing 146 having a side wall 148 which is inwardly turned at both its top and bottom to form a top wall 150 and a bottom wall 152. The top wall has a central circular opening 154 the diameter of which corresponds to the outer diameter of inlet assembly section 128. This allows the pocket assembly to fit over the lower portion of the inlet assembly and surround it. Flight assembly 138 includes a plurality of vanes 156 two of which **156*a*, 156*b* are shown in FIG. 2. The vanes curve upwardly about a hollow, frusto-conical support 158 to which the vanes are attached by bolts 160. The vanes thus create a spiral path for material. Plate 136 is bolted to the upper end of support 158. The upper, tip ends 162 of the flights are the portions of the flights most exposed to impacts from material thrown off plate 136**. However, the level of the tips is below that of the plate which lessens the number of impacts to which the tips are subjected.

Rather, the material flying off the plate will stike the inner face 164 of side wall 148 of the pocket assembly. Support 158 has an inwardly extending hub assembly 165 which comprises a collar fitting over the upper end of drive mechanism 142 and bolted thereto.

A screen assembly 166 is mounted radially outwardly of, and adjacent to, the flight assembly. The screen assembly includes a circumferentially extending screen 168 and a plurality of vertical screen supports 170, two such supports being shown in FIG. 2. Bottom wall 152 of the pocket assembly has a central, circular opening 172 which fits over the upper end of the flight assembly, so the base of the pocket assembly is below the level of the upper end of the flight assembly. Pocket assembly 144 is rotatably supported by screen assembly 166, with the bottom wall of the pocket assembly being supported by the upper ends of the screen supports 170. Because the screen assembly is connected to drive mechanism 142, the pocket assembly rotates with the screen assembly.

Material thrown off plate 136 is flung against inner face 164 of the pocket assembly. Face 164 is formed of, or lined with, a high-impact resistant material and provides a wear surface for incoming solid material to abrade against. The inner face therefore tolerates the constant impact forces which occur during a separation operation. Over time, a material build-up occurs in which fragments of material M, which are retained in the pocket area of the assembly, cling to face 164 and form a further lining. Also, the pocket assembly includes a plurality of vertically extending vanes 174 spaced circumferentially about the inner face of the pocket assembly. These vanes prevent solid material from slipping and not coming up to the rotational speed of the pocket assembly.

Figure 3:
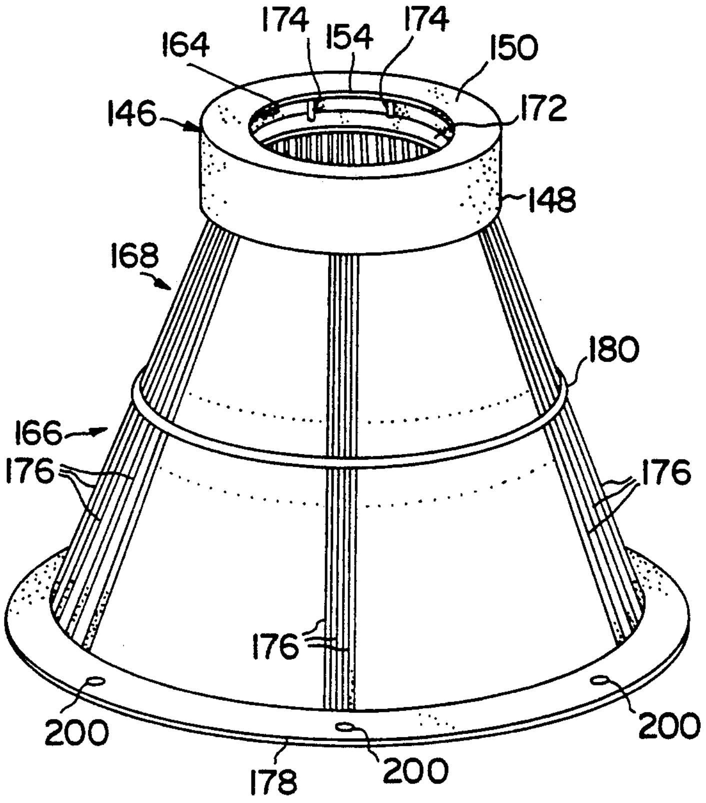
FIG. 3 is a perspective view of an integral pocket/-screen assembly of the improved separator.

With respect to screen 168, it will be noted that rather than extending upwardly to substantially the same level as the lower end of the inlet assembly, as screen 30 of FIG. 1 does, the upper end of screen 168 is substantially co-terminous with the lower end the pocket assembly. As seen in FIG. 3, pocket assembly 146 is integral with the upper end of screen assembly 166; the pocket assembly and screen assembly being connected together, for example, by welding. Thus, the upper end of the screen 168 is not subjected to the constant battering to which screen 30 is subjected, since it is substantially below the plate 136. This, in turn, substantially increases the useful life of the screen. In addition, the vanes 156*a*, 156*b* of the flight assembly do not have to extend as far upwardly as the vanes 42*a*, 42*b* of separator 10. Whereas the upper tip end 46 of vanes 42*a*, 42*b* extended well above its shown plate 24 of this prior art separator, and thus were subject to constant material impacts, the upper tip ends 162 of vanes 156*a*, 156*b* are well below the top surface of plate 136, as aforesaid. Since material thrown off plate 136 is flung outwardly rather than downwardly, the tip ends of these vanes are struck less often. In addition, the upper ends of these vanes is hardened to increase their impact resistance. Both this hardening, and the lowering of the height to which the vanes extend, increases their useful life significantly because they are now less prone to impact damage.

Figure 4:
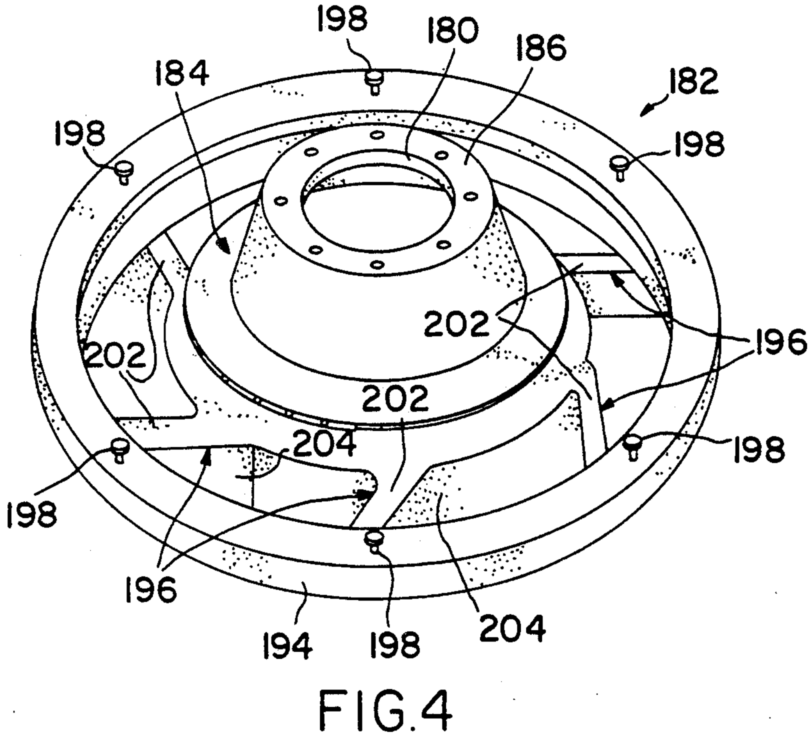
FIG. 4 is a perspective view of a rotor portion of the screen assembly; and, FIG. 5 is a partial bottom perspective view of the rotor.

Screen 168 is a perforated screen supported by a series of spaced rods 176 which angle inwardly from a circumferentially extending rim 178 located at the base of the screen assembly to the lower end of the pocket assembly. The space between the rods are covered by perforations of the screen through which the liquid passes. Thus the screen has an upwardly tapering shape with the spacing between adjacent rods being such as to allow free liquids to be thrown outwardly against the inner wall of the housing; while the solid material is retained between the flight assembly and the screen and falls, by gravity, to the bottom of the flight assembly. A circular support rod 180 fits about the screen support at its mid-point Referring to FIG. 4, the screen assembly includes a rotor indicated generally 182 which is connected to the drive mechanism of the separator. Rotor 182 has a generally frusto-conical main body section 184 the upper end of which is inwardly turned to form a mounting plate 186. Plate 186 has a central opening 180 which fits over a drive shaft 188 of drive mechanism 142. The plate is attached to the drive mechanism by bolts 192. The main body section of the rotor is sized to fit within the flight assembly support 158. The lower end of the rotor main body extends below the base of support 158. The rotor has a circumferential rim 194 which is spaced radially outwardly from the lower end of the main body section of the rotor. The rim is connected to the main body section of the rotor by a plurality of radially extending spokes 196. Rim 178 of the screen assembly fits on top of rim 194 and the pocket/screen assembly is attached to the rotor by bolts 198 fitted through holes 200 in rim 178. Thus, rotation of rotor 182 by the drive mechanism produces rotation of the pocket and screen assemblies.

Figure 5:
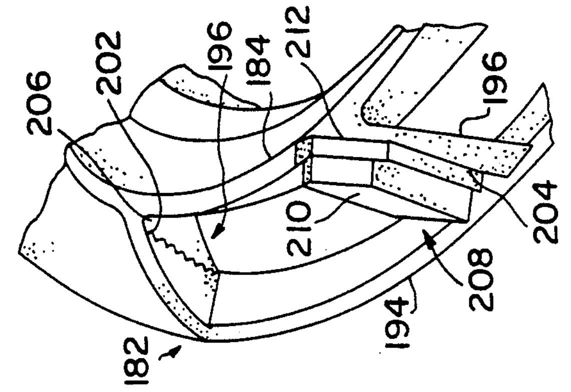

As the solid material reaches the bottom of the flight assembly, it falls through the space between the lower end of rotor body section 184 and rim 194. Because the rotor is moving, the spokes 196 will often strike the material as it falls. Because repeated impacts damages the spokes, the improvement of the present invention includes hardening, during the manufacturing process, of those surfaces of the spokes which hit, or get hit by, material. This, for example, would include the upper surface 202, and the side walls 204, 206 of each spoke (see FIGS. 4 and 5). In addition, because it may not be possible to harden all the spoke surfaces, rotor 182 is also provided with protection means 208 comprising wear pads 210 fitted to the forward side wall of each spoke, based upon the direction of rotation (side wall 204 in FIG. 5). A base plate 212 is first attached to the spoke side wall, and the wear pad is carried on the base plate. As the rotor turns, the wear pad will strike solid material falling from the flight assembly, rather than the side wall of the spoke. The result is the rotor has a prolonged useful life.

Referring again to FIG. 2, base section 102 of separator 100 has first and liquid outlet section 214, and a second and solid material outlet section 216. Section 214 is an annular, outer section which encompasses section 216, which is an inner section. Section 216 has a circumferential side wall 218. Attached to the outer face of side wall 218, by welding or other convenient manner, is a cap 220 having a circumferential side wall 222 the inner diameter of which corresponds to the outer diameter of side wall 218. The cap has a top face 224 in which is formed a central, circular opening 226. The diameter of this opening is slightly greater than the diameter of the rotor at the elevation of rim 194. As shown in FIG. 2, rim 178 of the screen assembly extends radially outwardly beyond opening 226. Further, the inner margin top surface 224 adjacent opening 226 is upwardly turned to form a lip 228. Cap 220 has a circumferential flange 230 extending horizontally from the outer face of its side wall 222 at a point intermediate the height of the side wall. Section 224 includes both the outer side wall 104 of base section 102, as well as an inner side wall 232, and a bottom floor 234. The side walls and floor form an annular fluid outlet, or drain, for the liquid removed from the material. Side wall 232 extends upwardly a height less than that of the outer side wall and has an inwardly turned, circumferential flange 236. Flange 230 of cap 220 sits upon flange 236, and the flanges are attached by bolts 238. Liquid flung outwardly through screen 168 as the material moves down the separator runs off down the inside of housing 110 into section 214 where it is drawn off.

The solid material falling through the spokes in the bottom of rotor 182 fall into outlet assembly 216. Because the flight assembly is rotating, material falling through the bottom of the rotor will have an angular velocity and thus may strike side wall 218 of the assembly. Further, material struck by one of the spoke, or hit by one of the wear pads, will also tend to be knocked outwardly against the side wall. Because repeated impacts will ultimately cause cracking or other damage to the side wall, a lining indicated generally 240 is provided to extend the useful life of outlet assembly 216. Lining 240 comprises a plurality of ceramic tiles 242 which extend completely about the inside of side wall 218 and extend from the top to the bottom of the outlet assembly As seen in FIG. 2, the tiles may be of different sizes, and their arrangement such that they are not readily dislocated by repeated strikes from the solid material. The solid material falling through the outlet assembly falls onto a conveyor, into a hopper, or onto some other convenient conveyance for transport to the next processing station.

In view of the foregoing, it will be seen that the several objects of the invention are achieved and other advantageous results are obtained. In particular, it is seen that separator 100 is an improved vertical, centrifugal separator in which various strategies are employed to improve the useful life of the separator components, reduce downtime, and improve maintenance costs. For example, replacing the upper end of the screen with a pocket assembly 146 reduces wear on the screen and replaces it with a more rugged material receiving fixture. By hardening various parts of the rotor spokes and providing wear pads at appropriate places, rotor life is substantially extended. Lastly, by lining the outlet assembly for solid material, a more rugged construction is provided which makes it less prone to damage and extends its useful life.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly connected to the drive mechanism and rotatably driven thereby, the screen assembly being driven at a separate speed than the flight assembly and including a perforated screen installed radially outwardly of the flight assembly and said vertical axis, and an inlet assembly positioned above said flight assembly and said screen assembly whereby material to be separated is introduced into the separator through the inlet assembly and is captured between the flight assembly and the screen assembly whereat material separation occurs, the inlet assembly having a discharge port, the improvement comprising pocket structure positioned between the discharge port of the inlet assembly and the upper end of the flight assembly, the pocket structure extending radially outwardly from said vertical axis and above the upper end of the flight assembly, and a lower end of the pocket structure extending below the upper end of the flight assembly, an upper wall connecting with an upper end of the pocket structure and extending downwardly towards the vertical axis, a lower wall connecting with the lower end of the pocket structure and extending inwardly towards the vertical axis thereof, the upper end of the screen assembly being substantially co-terminous with the lower end of the pocket structure whereby the upper end of the screen assembly terminates below the upper end of the flight assembly, the pocket structure having a sidewall formed as a circular housing and having the upper and lower walls integrally connected therewith, the pocket structure acting as a manes for catching material entering into the separator through the inlet assembly, the material impacting against said sidewall of the pocket structure rather than against the screen assembly, thereby to extend the useful life of the screen assembly, the pocket structure being rotatable with the screen assembly, said pocket structure includes a plurality of vanes for insuring that solid material directed at the pocket structure is brought up to rotational speed of the screen assembly and does not slip with respect to the movement of said pocket structure.

2. The improvement of claim 1 wherein the pocket structure and screen assembly are integral.

3. The improvement of claim 2 wherein the screen assembly includes a rotor mounted to the drive mechanism, the flight assembly being installed over the rotor, and the rotor having an outer circumferential rim at the base thereof to which the screen assembly is attachable.

4. The improvement of claim 3 wherein the rotor has a plurality of spokes extending between a central hub portion of the rotor and the rim, the area between the spokes comprising an outlet for solid material moving downward between the flight assembly and screen assembly.

5. The improvement of claim 4 wherein the spokes have hardened surfaces to protect them against impacts with the solid material and thereby prolonging the useful life of the rotor.

6. The improvement of claim 4 and further including protection means attached to the sides of the spokes to protect the spokes from impacts with the solid material and thereby prolonging the useful life of the rotor.

7. The improvement of claim 6 wherein the protection means comprises wear pads attached to the sides of the spokes against which the solid material strikes as the rotor rotates.

8. The improvement of claim 4 further including an outlet assembly for the solid material, the outlet assembly being positioned beneath the rotor and including wear resistant means for protecting the outlet assembly from the impact of solid material falling into the outlet assembly.

9. The improvement of claim 8 wherein the outlet assembly has a side wall and the wear resistant means includes a liner attached to the inside of the side wall against which the solid material impacts.

10. The improvement of claim 1 further including a plate onto which material introduced into the separator falls, the plate being rotatable by the drive mechanism whereby material falling on the plate is thrown off thereof into the pocket structure.

11. The improvement of claim 1 wherein the pocket structure has an inner face against which the material impacts, said inner face having a high impact resistant liner to prevent wear thereof with some material impacting the inner face tending to adhere thereto to provide an additional impact surface for the pocket structure.

12. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly connected to the drive mechanism and rotatably driven thereby, the screen assembly being driven at a separate speed than the flight assembly and including a perforated screen installed radially outwardly of the flight assembly and said vertical axis, and an inlet assembly positioned above said flight assembly and said screen assembly whereby material to be separated is introduced into the separator through the inlet assembly and is captured between the flight assembly the screen assembly whereat material separation occurs, the improvement comprising pocket structure positioned between the discharge port of the inlet assembly and the upper end of the flight assembly, said pocket structure comprising a sidewall forming a cylindrical housing and having integrally and inwardly extending top and bottom walls thereof to form said pocket structure for holding a quantity of material deposited therein, and to build up an impact cushion for subsequently deposit material thereat, the pocket structure being integral with the screen assembly and directing material to a space defined between the flight assembly and the screen assembly, the screen assembly including a rotor mounted to the drive mechanism, the flight assembly being installed over the rotor, the rotor having an outer circumferential rim at the base thereof to which the screen assembly is attachable, a plurality of spokes extending between a central hub portion of the rotor and the rim, the area between the spokes comprising an outlet for solid material moving downwardly between the flight assembly and the screen assembly, and protection means attached to the sides of the spokes to protect them from impacts with the solid material thereby prolonging the useful life of the rotor.

13. The improvement of claim 12 wherein the protection means comprises wear pads attached to the sides of the spokes against which the solid material strikes as the rotor rotates.

14. The improvement of claim 13 wherein the spokes have hardened surfaces to protect them against impacts with the solid material thereby prolonging the useful life of the rotor.

15. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly connected to the drive mechanism and rotatably driven thereby, the screen assembly being driven at a separate speed than the flight assembly and including a perforated screen installed radially outwardly of the flight assembly and said vertical axis, and an inlet assembly having a discharge port positioned above said flight assembly and said screen assembly whereby material to be separated is introduced into the separator through the inlet assembly and is captured between the flight assembly and the screen assembly whereat material separation occurs, the improvement comprising pocket structure positioned between the discharge port of the inlet assembly and the upper end of the flight assembly, said pocket structure comprising a sidewall forming a cylindrical housing and having integral and inwardly extending top and bottom walls formed therewith, the pocket structure being integral with the screen assembly and directing material to a space defined between the flight assembly and the screen assembly, the screen assembly including a rotor mounted to the drive mechanism, the flight assembly being installed over the rotor, the rotor having an outer circumferential rim at the base thereof to which the screen assembly is attachable and a plurality of spokes extending between a central hub portion of the rotor and the rim, the area between the spokes comprising an outlet for solid material moving downwardly between the flight assembly and screen assembly, and an outlet assembly for the solid material positioned beneath the rotor, the outlet assembly including wear resistant means for protecting the outlet assembly from the impact of solid madrigal falling into the outlet assembly.

16. The improvement of claim 15 wherein the outlet assembly has a sidewall and the wear resistant means includes a lining of ceramic plates affixed to the inner surface of the side wall.

17. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly also connected to the drive mechanism and rotatably driven thereby, the screen assembly being driven at a separate speed than the flight assembly and including a perforated screen installed radially outwardly of the flight assembly and said vertical axis, and an inlet assembly positioned above said flight assembly and said screen assembly whereby material to be separated is introduced into the separator through the inlet assembly and is captured between the flight assembly and the screen assembly whereat material separation occurs, said inlet assembly having a discharge port, the improvement comprising pocket structure positioned between a discharge port of the inlet assembly and the upper end of the flight assembly, the pocket structure extending radially outwardly from said vertical axis and beyond an upper end of the flight assembly, and a lower end of the pocket structure extending below the upper end of the flight assembly, said pocket structure having a sidewall, the upper end of the screen assembly being substantially coterminous with the lower end of the pocket structure whereby the upper end of the screen assembly terminates below the upper end of the flight assembly, the pocket structure acting as a means for catching material entering into the separator through the inlet assembly, the material impacting against the sidewall of the pocket structure rather than against the screen assembly thereby to extend the useful life of the screen assembly, said pocket structure being rotatable with the screen assembly, said pocket structure including a plurality of means for insuring that solid material directed at the pocket structure is brought up to the rotational speed of the screen assembly and does not slip with respect to the movement of the pocket structure, a plate connecting onto the flight assembly, said plate disposed for reception of the material introduced into the separator and upon which the material falls, said plate being rotatable by the drive mechanism whereby material falling onto the plate is thrown off thereof and into the pocket structure, the flight assembly comprising a plurality of flight vanes extending generally upwardly from the base of the flight assembly to the top thereof, said vanes having upper tip ends terminating at a height below the level of the top of the plate thereby to substantially avoid being struck by material thrown off said plate.

18. The improvement of claim 17 wherein the upper tip ends of the flight vanes are hardened to resists damage caused by the impact of material thereon.

19. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly also connected to the drive mechanism and rotatably driven thereby, the screen assembly being driven at a separate speed than the flight assembly and including a perforated screen installed radially outwardly of the flight assembly and the vertical axis, and an inlet assembly positioned above the flight assembly and said screen assembly whereby material to be separated is introduced into the separator through the inlet assembly and is captured between the flight assembly and the screen assembly whereat material separation occurs, said inlet assembly having a discharge port, the improvement comprising pocket structure positioned between a discharge port of the inlet assembly and the upper end of the flight assembly, the pocket structure extending radially outwardly from said vertical axis and beyond the upper end of the flight assembly, and a lower end of the pocket structure extending below the upper end of the flight assembly, the upper end of the screen being substantially coterminous with the lower end of the pocket structure whereby the upper end of the screen assembly terminates below the upper end of the flight assembly, the pocket structure acting as a means for catching material entering into the separator through the inlet assembly, the material impacting against a sidewall of the pocket structure rather than against the screen assembly thereby to extend the useful life of the screen assembly, the pocket structure being rotatable with the screen assembly, said pocket structure including a plurality of vanes for insuring that solid material directed at the pocket structure is brought up to the rotational speed of the screen assembly and does not slip with respect to the movement of said pocket structure, the pocket structure and screen assembly being integral, the screen assembly including a rotor mounted to the drive mechanism, the flight assembly being installed over the rotor, and the rotor having an outer circumferential rim at the base thereof to which the screen assembly is attachable, the rotor having a plurality of spokes extending between a central hub portion of the rotor and the rim, the area between the spokes comprising an outlet for the solid material moving downwardly between the flight assembly and screen assembly, an outlet assembly for the solid material, the outlet assembly being positioned beneath the rotor and including wear resistant means for protecting the outlet assembly from the impact of the solid material falling into the outlet assembly, the outlet assembly having a sidewall, and the wear resistant means including a liner attached to the inside of the sidewall against which the solid material impacts upon discharge, said liner comprising ceramic plates affixed to the inner surface of the outlet assembly sidewall.

20. In a centrifugal separator comprising a vertical drive mechanism including a drive shaft rotatable about a vertical axis about which the centrifuge rotates, a flight assembly attached to the drive shaft and rotatably driven thereby, said flight assembly having an upper end, a screen assembly also connected to the drive mechanism and rotatably driven thereby, the screen assembly being driven at a separate speed than the flight assembly and including a perforated screen installed radially outwardly of the flight assembly and said vertical axis, and an inlet assembly having a discharge port positioned above said flight assembly and said screen assembly whereby material to be separated is introduced into the separator through the inlet assembly and is captured between the flight assembly and the screen assembly whereat material separation occurs, the improvement comprising pocket structure positioned between the discharge port of the inlet assembly and the upper end of the flight assembly, the pocket structure being integral with the screen assembly and directing material to a space defined between the flight assembly and the screen assembly, the screen assembly including a rotor mounted to the drive mechanism, the flight assembly being installed over the rotor, the rotor having an outer circumferential rim at the base thereof to which the screen assembly is attachable, and a plurality of spokes extending between a central hub portion of the rotor and the rim, the area between the spokes comprising an outlet for solid material moving downwardly between the flight assembly and screen assembly, and an outlet assembly for the solid material positioned beneath the rotor, the outlet assembly including wear resistant means for protecting the outlet assembly from the impact of solid material falling there into, the outlet assembly having a sidewall, and the wear resistant means includes a lining of ceramic plates affixed to the inner surface of the sidewall.

* * * * *

UNITED STATES PATENT AND TRADEMARK OFFICE

CERTIFICATE OF CORRECTION

PATENT NO. : 5,256,289

DATED : October 26, 1993

INVENTOR(S) : Dewey M. Cope, & Harry E. Derton

It is certified that error appears in the above-identified patent and that said Letters Patent is hereby corrected as shown below:

Claim 1, column 8, line 15, change "downwardly" to ---inwardly---; line 25, change "manes" to ---means---.

Claim 12, column 9, line 20, after "a screen assembly" insert ---also---; line 31, change "port" to ---end---.

Claim 15, column 9, line 66, after "a screen assembly" insert ---also---; column 10, line 29, change "madrigal" to ---material---.

Claim 18, column 11, line 17, change "resists" to ---resist---.

Signed and Sealed this

Twenty-ninth Day of March, 1994

Attest:

Bruce Lehman

BRUCE LEHMAN

*Attesting Officer* *Commissioner of Patents and Trademarks*